United States Patent [19]

Tugukuni et al.

[11] 3,914,335

[45] Oct. 21, 1975

[54] CROSS-LINKING COATING COMPOSITION

[75] Inventors: Hideyoshi Tugukuni, Sakai; Masafumi Kano, Kyoto; Yoshihisa Chikazoe, Ibaraki, all of Japan

[73] Assignee: Dai Nippon Toryo Co., Ltd., Osaka, Japan

[22] Filed: Sept. 6, 1973

[21] Appl. No.: 394,716

[30] Foreign Application Priority Data

Sept. 13, 1972 Japan............................ 47-92135

[52] U.S. Cl.................. 260/859 R; 260/3; 260/5; 260/75 TN; 260/75 NT; 260/77.5 CR; 260/77.5 TB; 260/858

[51] Int. Cl.²..................... C08L 9/00; C08L 75/04

[58] Field of Search...260/859 R, 77.5 TB, 77.5 CR, 260/3, 5, 75 TN, 75 NT, 858

[56] References Cited

UNITED STATES PATENTS

| | | | |
|---|---|---|---|
| 2,609,349 | 9/1952 | Cass | 260/23 |
| 3,373,221 | 3/1968 | May | 260/23 |
| 3,405,087 | 10/1968 | Fryd | 260/859 |
| 3,455,857 | 7/1969 | Holzrichter | 260/23 |
| 3,542,739 | 11/1970 | Krimm et al. | 260/77.5 |
| 3,677,920 | 7/1972 | Kai et al. | 260/3 |
| 3,694,389 | 9/1972 | Levy | 260/77.5 |
| 3,694,416 | 9/1972 | Rubens et al. | 260/859 |
| 3,723,372 | 3/1973 | Wakimoto et al. | 260/77.5 |
| 3,745,138 | 7/1973 | Koerner et al. | 260/859 |
| 3,810,855 | 5/1974 | Tugukuni et al. | 260/18 |

*Primary Examiner*—Eugene C. Rzucidlo
*Attorney, Agent, or Firm*—Waters, Schwartz & Nissen

[57] ABSTRACT

This invention relates to a thermosetting composition obtained by polymerizing in an organic liquid (1) a copolymerizable unsaturated monomer having a latent isocyanate group and being capable of releasing a free isocyanate group under heating and/or (2) an $\alpha$,$\beta$-ethylenically unsaturated monomer in the presence of (3) a component solvated in said organic liquid, at least one of said monomer (2) and said component (3) having a latent isocyanate group capable of releasing a free isocyanate group under heating and at least one of said monomers (1) and (2) and component (3) having an active hydrogen atom; a powdery coating composition prepared from said thermosetting composition by spray drying; and a process for the production of such coating compositions.

15 Claims, No Drawings

CROSS-LINKING COATING COMPOSITION

DESCRIPTION OF THE PRIOR ART

It is well-known that non-aqueous synthetic polymer dispersions have been developed as coating compositions overcoming the defects of solvent solutions and aqueous emulsions of synthetic polymers. Some of the methods for preparing such thermosetting polymer dispersions are described below:

1. A method for forming a cross-linkable polymer dispersion comprising the first step of copolymerizing an ethylenically unsaturated monomer with another ethylenically unsaturated monomer having a chemically reactive, crosslinking group in the presence of a block or graft copolymer dispersion stabilizer and the second step of adding an ethylenically unsaturated monomer and another ethylenically unsaturated monomer having a complementary, chemically reactive, cross-linking group to the reaction mixture and copolymerizing them in the reaction mixture (see U.S. Pat. No. 3,282,297 and British Pat. No. 1,095,288).

2. A method for preparing a cross-linkable dispersion having an automatically oxidative compound or a component capable of free-radical initiating addition reaction, which comprises forming a dispersion of an insoluble polymer containing at least one chemically reactive group per molecule of the polymer by dispersion polymerization of an $\alpha,\beta$-ethylenically unsaturated monomer in the presence of a stabilizer, and reacting the resulting insoluble polymer with an unsaturated component having a complementary, chemically reactive group (see Japanese Pat. No. 9,708/71).

3. A method for forming a coating composition which comprises copolymerizing an olefinically unsaturated monomer having an alcoholic hydroxyl group with another olefinically unsaturated monomer in the presence of a polymer soluble in an organic liquid, and reacting the resulting copolymer with a polyisocyanate (see Japanese Pat. No. 25,015/71).

As is apparent from the foregoing explanation, each of the conventional cross-linkable polymer dispersions is of the one-component type, and both the chemically reactive, cross-linking group and the complementary, chemically reactive, cross-linking group are present in said one component. Accordingly, the reaction readily occurs between the chemically reactive, cross-linking group and the complementary, chemically reactive, cross-linking group in such polymer dispersion. Therefore, cross-linking and gelation occur during the synthetic reaction and hence, the thermal stability and storage stability of the resulting polymer dispersion are extremely poor.

In the case of a dispersion of a polymer capable of autoxidation or free radical-initiating cross-linking, limitations are imposed on the system for such autoxidation or radical-initiating cross-linking reaction. More specifically, in the case of a polymer dispersion of the autoxidation type, the kind of the automatically oxidative component which can be used is limited, and therefore, application fields of the polymer dispersion are greatly limited. In the case of a polymer dispersion of the radical-initiating cross-linking reaction type, since it is difficult to obtain a cross-linked polymer because a linear polymer is easily formed, the kind of the component which can be used is greatly limited. Furthermore, in the case of a polymer dispersion of this type, it is impossible to obtain thermosetting characteristics for formation of a film or coating.

As a method overcoming these defects, there has been proposed a method for forming a cross-linkable polymer dispersion by using a melamine resin, a blocked isocyanate compound and the like in combination with the foregoing components. However, in the polymer dispersion obtained by such method, such additional component is merely added and mixed mechanically, and hence, the defect of precipitation during storage is frequently observed. Further, in case a melamine resin is employed, since formalin is released under heating, its toxicity is a great problem.

Powdery coating compositions free of a solvent have been known, and in some of them, a blocked isocyanate is used as a curing agent. However, conventional powdery coating compositions prepared by employing a blocked isocyanate are defective in that gelation occurs during the manufacturing step and the storage stability is poor.

SUMMARY OF THE INVENTION:

This invention relates to a novel thermosetting composition which can overcome the foregoing defects involved in the conventional techniques.

More particularly, this invention relates to a thermosetting composition obtained by polymerizing in an organic liquid (1) a copolymerizable unsaturated monomer having a latent isocyanate group and being capable of releasing a free isocyanate group under heating and/or (2) an $\alpha,\beta$-ethylenically unsaturated monomer in the presence of (3) a component solvated in said organic liquid, at least one of said monomer (2) and said component (3) having a latent isocyanate group capable of releasing a free isocyanate group under heating and at least one of monomers (1) and (2) and component (3) having an active hydrogen atom; a powdery coating composition prepared from said thermosetting composition by spray drying; and a process for the production of such coating compositions.

DETAILED DESCRIPTION OF THE INVENTION:

The objects of this invention are as follows:

1. To obtain a coating composition in which gelation or the like does not occur during the synthetic reaction.
2. To obtain a coating composition having excellent storage stability.
3. To obtain a film having high chemical resistance, solvent resistance and good rust-preventive property.
4. To obtain a coating composition which does not release such toxic substances as formalin under heating and baking conditions.

Firstly, a thermosetting synthetic polymer dispersion of this invention is prepared in the following manner.

I. In case a component solvated in an organic liquid capable of dissolving monomers but incapable of dissolving polymers formed from the monomers contains a group capable of releasing an isocyanate group under heating.

a. A copolymerizable, $\alpha,\beta$-ethylenically unsaturated monomer (monomer A) is polymerized or (a) a copolymerizable, $\alpha,\beta$-ethylenically, unsaturated monomer (monomer A) and a copolymerizable unsaturated monomer having a latent isocyanate group are polymerized, in said organic liquid in the presence of said component solvated in the organic liquid, with the proviso that at least one member of said two components or three components has a group containing an active hydrogen atom.

II. In case a component solvated in the organic liquid does not contain a group capable of releasing an isocyanate group under heating.

A copolymerizable, $\alpha,\beta$-ethylenically unsaturated monomer (monomer A) and an unsaturated monomer having a latent isocyanate group are polymerized in said organic liquid in the presence of said component solvated in the organic liqiud, with the proviso that at least one member of said three components has a group containing an active hydrogen atom.

By adopting the above procedure (I) or (II), a thermosetting polymer dispersion can be obtained.

In the polymer dispersion of this invention, in case an unsaturated double bond is present in the component solvated in the organic liquid, the copolymerizable monomer is block- or graft-copolymerized with said component. In case the content of the unsaturated double bond is extremely low in the component solvated in the organic liquid, the resulting copolymer is closely entangled with said component and is present stably in the organic liquid.

Accordingly, in the polymer dispersion of this invention, each polymer particle is stably dispersed in the organic liqiud with the solvated component being disposed on the outer peripheral portion.

In the polymer dispersion of this invention, the active hydrogen group, which is reacted with the latent isocyanate group at the film-forming stage, may be present in either the component solvated in the organic liquid or the copolymerizable monomer, or in both of them. In each case, the blocking agent is released from the latent isocyanate group by heating, and the resulting isocyanate group is reacted with the reactive hydrogen group to form a strong cross-linkage.

Secondly, the powdery coating composition of this invention is prepared in the following manner.

Namely, a powdery coating composition is formed by adjusting the non-volatile content to 20 to 65% by weight in the thermosetting polymer dispersion obtained by the above-mentioned process, and subjecting the polymer dispersion to spray drying. when the thus formed powdery composition is heated at a temperature exceeding the softening point of the polymer particles, a free isocyanate group is released from the latent isocynate group and it is reacted with the active hydrogen atom to give a film having a three-dimensional, cross-linked structure and excellent properties.

Each component to be used in this invention will now be illustrated by reference to specific examples thereof.

The organic liquid to be used in this invention, which is capable of dissolving monomers but incapable of dissolving polymers formed from the monomers, includes organic liquids having no polarity or a relatively low dissolving power, such as mixtures of aliphatic and aromatic hydrocarbons, e.g., VM & P naphtha, mineral spirits, kerosene, petroleum naphtha and solvent naphtha; aliphatic hydrocarbons, e.g., n-butane, n-hexane, n-heptane, n-octane, isononane, n-decane and n-dodecane; and alicyclic hydrocarbons, e.g., cyclopentane, cyclohexane and cycloheptane. They may be used singly or in the form of admixtures of two or more of them.

As the component to be used in the state solvated in the organic solvent in this invention, the following may be mentioned:
1. Unsaturated fatty acid-containing oil-modified alkyd resins.
2. Unsaturated fatty acid-containing oil-modified epoxy resins.
3. Unsaturated fatty acid-containing oil-modified epoxy-modified alkyd resins.
4. Maleic oil resins.
5. Urethanated oil resins.
6. Vinyl polymers.
7. Natural and synthetic rubbers.
8. $\alpha,\beta$-Ethylenically unsaturated monomers, homopolymers of which can be solvated in the above organic liquid (hereinafter referred to as "monomer B").

Unsaturated fatty acid-containing oils to be preferably used in this invention include drying oils and semi-drying oils such as linseed oil, tung oil, Chinese tung oil, oiticica oil, perilla oil, dehydrated castor oil, tall oil, soybean oil, safflower oil, cotton seed oil and rice bran oil. In some cases, non-drying oils such as coconut oil, olive oil and castor oil can be used. These oils may be used singly or in the form of admixtures of two or more of them.

The "unsaturated fatty acid-containing oil-modified alkyd resin" to be used in this invention includes those obtained by polycondensing (1) a basic acid component selected from (a) saturated polybasic acids such as phthalic anhydride, terephthalic acid, isophthalic acid, tetrachlorophthalic anhydride, tetrahydrophthalic anhydride, succinic acid, adipic acid and sebacic acid, (b) unsaturated polybasic acids such as maleic acid, maleic anhydride, fumaric acid, itaconic acid and citraconic acid, (c) polybasic acids obtained by diene-synthesis such as cyclopentadiene-maleic anhydride adduct, terpene-maleic anhydride adduct and rosin-maleic anhydride adduct, and (d) monobasic acids such as benzoic acid and p-tert-butyl-benzoic acid, (2) a polyhydric alcohol component selected from (a) dihydric alcohols such as ethylene glycol, diethylene glycol, triethylene glycol, propylene glycol, trimethylene glycol and tetramethylene glycol and (b) trihydric alcohols such as glycerin and trimethylol propane, and (3) an oil component selected from the above-exemplified oils.

These oil-modified alkyd resins may be prepared by condensing the above components by customary methods, and they have a molecular weight of 500 to 10,000, preferably 2,000 to 4,000, and an acid value of less than 75, preferably less than 15. In case these resins are used as an active hydrogen-containing component, these modified resins should have an OH value of at least 10.

In the preparation of the oil-modified alkyd resins, it is possible to obtain OH group-containing products optionally by selecting starting materials or reaction conditions appropriately in compliance with known techniques.

The "unsaturated fatty acid-containing oil-modified epoxy resin" to be used in this invention includes resins having an acid value of less than 75, preferably less than 15, and a molecular weight of about 1,000 to about 3,000, which are formed by esterifying an epoxy resin with an oil component such as those mentioned above. In case such resin is used as an active hydrogen-containing component, it should have an OH value of at least 10.

The "unsaturated fatty acid-containing oil-modified epoxy-modified alkyd resin" to be used in this invention includes resins having an acid value of less than 75, preferably less than 15, and a molecular weight of about 1,000 to about 4,000, which are obtained by reacting an esterified epoxy resin such as that mentioned above with a polyhydric alcohol and a mono- or polybasic acid. In case such resin is used as an active hydrogen-containing component, it should have an OH value of at least 10.

The epoxy resin to be used for formation of the above esterified epoxy resin and epoxy-modified alkyd resin includes resins having at least two epoxy groups in the molecule, such as epoxy resins of the bisphenol A-epichlorohydrin condensation type, the bisphenol F type, the tetrahydroxyphenyl methane type, the novolac type, the polyglycerol type and of the glycerine triether type. The weight ratio of such epoxy resin to the oil component is preferably within the range of from 5/95 to 70/30.

As the basic acid to be used for formation of the epoxy-modified alkyd resin, there may be mentioned mono- and poly-basic acids such, for example, as benzoic acid, p-tert-butylbenzoic acid, phthalic anhydride, maleic anhydride, isophthalic acid, terephthalic acid, tetracnlorophthalic anhydride, HET acid, succinic acid, adipic acid and sebacic acid. As the polyhydric alcohol, there may be exemplified ethylene glycol, propylene glycol, diethylene glycol, butylene glycol, 2,2'-dimethyl-propanediol, glycerol, trimethylol ethane, trimethylol propane, 1,2,6-hexanetriol, pentaerythritol, sorbitol, diglycerol and dipentaerythritol.

The "maleic oil resin" to be used in this invention includes resins having an acid value of less than 75, preferably less than 15, and a molecular weight of about 1,000 to about 2,000, which are formed by addition reaction between an oil component such as those mentioned above and maleic anhydride, maleic acid, fumaric acid or a derivative of maleic anhydride. It is preferred that in the above addition reaction the ratio of the acid component to the unsaturated fatty acid-containing oil component is within the range of from 5/95 to 20/80. In case such resin is used as an active hydrogen-containing component, it should have an OH value of at least 10.

Specific examples of the maleic resin are as follows.
1. Maleic oil formed from linoleic acid and maleic anhydride and expressed by the following formula:

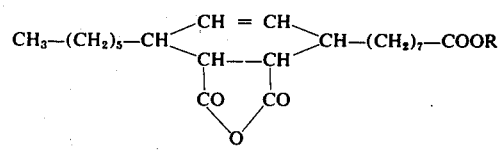

2. Maleic oil resin formed from oleosteric acid and maleic anhydride and expressed by the following formula:

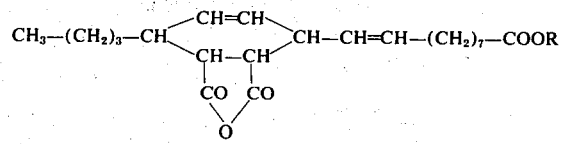

or

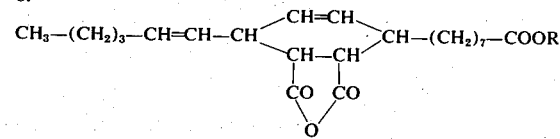

3. Maleic oil resin formed from oleic acid and maleic anhydride and expressed by the following formula:

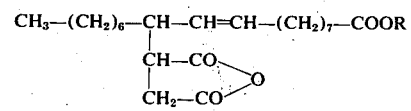

If necessary, it is possible to introduce active hydrogen atoms into the maleic oil resin by reacting it with a polyhydric alcohol such as for example, those exemplified above with respect to the unsaturated fatty acid-containing oil-modified alkyd resin.

The "urethanated oil resin" to be used in this invention includes resins having an acid value of less than 20 and a molecular weight of about 1,000 to about 3,000, which are formed by the reaction between such a diisocyanate as those mentioned below and a nomoglyceride or diglyceride which is a product formed by the reaction between a polyhydric alcohol and an oil component selected from those mentioned above. In the urethanated oil resin, it is preferred that the weight ratio of the isocyanate component (glyceride) is within the range of from 5/95 to 70/30. In case this resin is used as an active hydrogen-containing component, it should have an OH value of at least 10.

As the polyhydric alcohol to be used for formation of the glyceride component, there may be mentioned, for example, ethylene glycol, propylene glycol, diethylene glycol, butylene glycol, 2,2'-dimethylolpropanediol, glycerol, trimethylol ethane, trimethylol propane, 1,2,6-hexanetriol, pentaerythritol, sorbitol, diglycerol and dipentaerythritol.

The preparation of a monoglyceride and the formation of the urethanated oil resin from, for example, a monoglyceride and a diisocyanate are expressed by the following formulae:

1. Preparation of Monoglyceride:

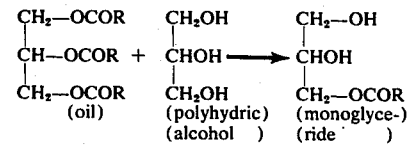

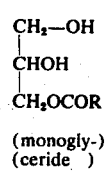

(monogly-)
(ceride )

2. Formation of Urethanated Oil Resin:

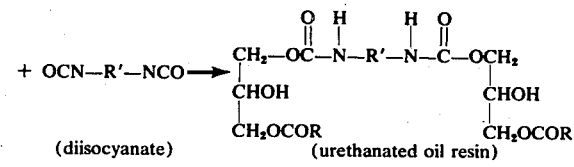

Formation of urethanated oil resins from the above oil, polyhydric alcohol and diisocyanate components may be effected according to known synthesis methods, and commercially available urethanated oil resins may also be used in this invention.

The "vinyl polymer" to be used in this invention as the component solvated in the organic liquid includes copolymers formed from at least two members selected from vinyl monomers B which will be mentioned below; and co-polymers formed from the major amount, preferably at least 90 mole percent, of at least one vinyl monomer B with a minor amount, preferably up to 10 mole percent, of a hydroxy group-containing monomer such as 2-hydroxyethyl acrylate, 2-hydroxypropyl acrylate, 2-hydroxyethyl methacrylate, 2-hydroxypropyl methacrylate and N-methylol acrylamide, an acrylic acid ester such as methyl acrylate, ethyl acrylate, n-propyl acrylate, isopropyl acrylate, n-butyl acrylate, tert-butyl acrylate and 2-ethylhexyl acrylate, a methacrylic acid ester such as methyl methacrylate, ethyl methacrylate, n-butyl methacrylate and tert-butyl methacrylate, a styrene type monomer such as styrene, vinyl toluene and α-methylstyrene, and another α,β-ethylenically unsaturated monomer such as vinyl acetate, vinyl propionate, acrylonitrile, vinyl stearate, acryl acetate, diallyl adipate, dimethyl itaconate, diethyl maleate, vinyl chloride, vinylidene chloride and ethylene.

Such vinyl polymer has a molecular weight of about 1,000 to 20,000. In case the vinyl polymer is used as the active hydrogen-containing group, it should have an OH value of at least 10.

The "natural or synthetic rubber" to be used in this invention includes natural rubbers such as crepe raw rubber and crepe compounded rubber, and synthetic rubbers such as polyisobutylene, polyisoprene, polychloroprene, isoprene-isobutylene copolymers, polybutadiene, butadiene-styrene, copolymers, butadiene-acrylonitrile copolymers and butadiene-isobutylene copolymers. It is preferred that such rubber have a molecular weight of about 5,000 to about 50,000.

As the monomer B, there can be used, for example, alkyl acrylates and methacrylates having at least 6 carbon atoms, preferably 6 to 18 carbon atoms, in the alkyl portion, dialkyl fumarates having at least 6 carbon atoms in each alkyl portion and dialkyl itaconates having at least 6 carbon atoms in each alkyl portion. Specific examples of the monomer B are 2-ethylhexyl acrylate, lauryl acrylate, tridecyl acrylate, stearyl acrylate, cyclohexyl acrylate, hexyl acrylate, isodecyl acrylate, dodecyl acrylate and octadecyl acrylate; 2-ethylhexyl methacrylate, lauryl methacrylate, tridecyl methacrylate, cyclohexyl methacrylate, hexyl methacrylate, isodecyl, methacrylate, dodecyl methacrylate and octadecyl methacrylate; dihexyl fumarate, dioctyl fumarate, di-2-ethylhexyl fumarate, didodecyl fumarate and dioctadecyl fumarate; dihexyl itaconate, di-2-ethylhexyl itaconate, didocyl itaconate and dioctadecyl itaconate; and vinyl stearate.

In case a group capable of releasing an isocyanate group under heating is incorporated into the component solvated in the organic liquid, a solvated component selected from the above-mentioned components (1) to (8) and a copolymerizable unsaturated monomer capable of releasing an isocyanate group under heating (hereinafter referred to as "latent isocyanate-containing unsaturated monomer", which will be detailed below, are copolymerized or block- or graft-polymerized at a temperature lower than the isocyanate-releasing temperature, preferably 50° to 120°C, for 1 to 10 hours according to customary procedures.

The thus obtained component solvated in the organic liquid, which contains or is free of a group capable of releasing an isocyanate group under heating constitutes 5 to 90% by weight of the total dispersed solids in the resulting polymer dispersion. It is preferred that this solvated component constitute 30 to 90% by weight of the total solids when the solvated component is selected from components (1) to (5) and that it constitute 5 to 65% by weight of the total solids when it is selected from components (6) to (8).

The "latent isocyanate-containing unsaturated monomer" to be used in this invention includes those having a copolymerizable unsaturated double bond >C=C< in the molecule and contains a group capable of releasing an active isocyanate group under heating. For instance, there can be mentioned (a) an amineimide monomer, (b) a monomer derived from a polyisocyanate in which one of the isocyanate groups of the polyisocyanate is reacted with an α,β-ethylenically unsaturated monomer having an active hydrogen atom and the remaining isocyanate groups are masked with a blocking agent having an active hydrogen atom, and (c) a monomer obtained by masking vinyl isocyanate with a blocking agent having an active hydrogen atom. Each of these monomers (a), (b) and (c) will now be described more specifically.

As the amineimide monomer (a), there can be mentioned, for instance, trimethylamine methacrylimide, 1,1'-dimethyl-1-(2-hydroxylpropyl)-amine methacrylimide and 1,1'-dimethyl-1-(2,3-dihydroxypropyl)-amine methacrylimide.

The monomer (b) derived from a polyisocyanate in which one of isocyanate groups of the polyisocyanate is reacted with an α,β-ethylenically unsaturated monomer having an active hydrogen atom and the remaining isocyanate groups are masked with a blocking agent having an active hydrogen atom is prepared, for instance, by the following method. Namely, such monomer (b) is prepared by a method comprising reacting (i) a polyisocyanate such as ethylene diisocyanate, propylene diisocyanate, tetramethylene diisocyanate, hexamethylene diisocyanate, decamethylene diisocyanate, phenylene diisocyanate, tolylene diisocyanate, naphthylene diisocyanate, 4,4'-methylene-bis(phenyl isocyanate), 4,4'-ethylene-bis(phenyl isocyanate), 3,3'-diisocyanato-1,4-dimethylbenzene, 1-methyl-2,4-diisocyanato-cyclohexanone, 3,3'-diisocyanato-diethylbenzene, 3,3'-diisocyanato-dimethyltoluene, 3,-3'-diisocyanato-diethyltoluene, 3,3'-diisocyanato-dimethylxylene, 3,3'-diisocyanato-di-ethylxylene, 4,4'-methylene-bis(cyclohexyl isocyanate), 4,4'-ethylene-bis(cyclohexyl isocyanate), isophoronediamine diisocyanate, lysine isocyanate methyl ester and triphenylmethane triisocyanate, a diisocyanate or polyisocyanate obtained by addition reaction between an excess of a polyisocyanate such as those mentioned above and a low-molecular-weight polyol such as ethylene glycol, propylene glycol, 1,3-butylene glycol, neopentyl glycol, 2,2,4-trimethyl-1,3-pentadiol, hexamethylene glycol, cyclohexane dimethanol, trimethylol, propane, hexanetriol, glycerol, sorbitol, sucrose and pentaerythritol, a polyisocyanate having a biuret structure or a polyisocyanate having an allophanate linkage, with (ii) a monomer having an active hydrogen atom such, for example, as a hydroxyl group-containing monomer, e.g., 2-hydroxyethyl acrylate, 2-hydroxypropyl acrylate, 2-hydroxyethyl methacrylate, 2-hydroxypropyl methacrylate, allyl alcohol, cinnamic alcohol and crotonyl alcohol, an unsaturated carboxylic acid, e.g., acrylic acid, methacrylic acid, maleic acid, fumaric acid, crotonic acid and itaconic acid, and glycidyl methacrylate, acrylamide and methacrylamide; and then masking the remaining free isocyanate groups with a blocking agent of the phenol, lactam, active methylene, alcohol, mercaptan, acid amide, imide, amine, imidazole, urea, imine, oxime or sulfite type.

Among the above-exemplified isocyanates, diisocyanates and triisocyanates are preferred. Especially preferred are such aliphatic, alicyclic and aromatic isocyanates such as ethylene diisocyanates, tetramethylene diisocyanate, hexamethylene diisocyanate, 4,4'-methylene-bis(cyclohexyl isocyanate), lysine isocyanate methyl ester, 4,4'-ethylene-bis(cyclohexyl isocyanate), ω,ω'-diisocyanato-1,3-dimethylbenzene, ω,ω'-diisocyanato-1,4-dimethylbenzene and isophorone diisocyanate; and adducts formed by reacting an excess of such isocyanate with a low-molecular-weight polyol such as mentioned above. These isocyanate compounds may be used singly or in the form of admixtures of two or more of them.

The monomer (c) obtained by masking vinyl isocyanate with a blocking agent having an active hydrogen atom is prepared, for example, by a method comprising chlorinating an unsaturated carboxylic acid such as acrylic acid, methacrylic acid, $\beta,\beta'$-dimethyl-acrylic acid, triethylacrylic acid, n-butyl-acrylic acid, 1-n-hexyl-acrylic acid, 1-cyclohexyl-acrylic acid, $\alpha$-phenyl-acrylic acid, maleic acid, monobutyl maleate, fumaric acid, itaconic acid and crotonic acid with a chlorine compound such as thionyl chloride, oxalyl chloride, acetyl chloride, phosphorus pentachloride and phosphorus trichloride, reacting the chlorination product with sodium azide to obtain an acid azide, heating the acid azide to release $N_2$ to obtain vinyl isocyanate and masking it with an active hydrogen-containing blocking agent such as mentioned above.

These latent isocyanate-containing monomers can be used singly or in the form of admixtures of two or more of them.

Among the above-mentioned latent-isocyanate-containing monomers (a), (b) and (c), the monomer (c) is especially preferred because the molecular weight is low and the latent isocyanate group can be introduced by use of a small amount of the monomer.

The latent isocyanate-containing monomer is used in an amount of 3 to 80% by weight, preferably 5 to 40% by weight, based on the total components. In case the latent isocyanate-containing monomer is not soluble in the organic liquid of no polarity or of a low dissolving power to be used in this invention, it is necessary to employ a small amount of a polar solvent in combination with the organic liquid and dissolve the monomer.

The masking reaction using the blocking agent for formation of the foregoing latent isocyanate-containing monomers (b) and (c) is generally carried out at 50° to 160°C in an inert solvent, if necessary with the use of a catalyst.

Any inert solvents that are free of an active hydrogen atom and are ordinarily used for the isocyanate-blocking reaction can be used as the inert solvent in the above masking reaction. Examples of such inert solvents include esters such as ethyl acetate and butyl acetate, ketones such as methyl-ethyl-ketone and methyl-isobutyl-ketone, ethers such as diethyl ether and cellulose acetate, and aromatic hydrocarbons such as benzene and toluene.

As the catalyst to be used for formation of the blocked isocyanate compound, there can be employed those customarily used for the ordinary blocking reaction of isocyanate compounds. For instance, there can be mentioned tertiary amines such as triethyl amine, triethylene diamine and N-methyl morpholine, and organic tin compounds such as stannous octoate, dibutyl tin dilaurate and distannoxane.

As the blocking agent to be used for formation of the latent isocyanate-containing unsaturated monomer, the following compounds can be mentioned.

a. Phenol type blocking agent

Phenol, cresol, xylenol, nitrophenol, chlorophenol, ethylphenol, t-butylphenol, hydroxybenzoic acid, hydroxybenzoic acid esters, 2,5-di-tert-butyl-4-hydroxytoluene, etc.

b. Lactam type blocking agent $\epsilon$-Caprolactam, $\delta$-valerolactam, $\gamma$-butyrolactam, $\beta$-propiolactam, etc.

c. Active methylene type blocking agent

Diethyl malonate, dimethyl malonate, ethyl acetoacetate, methyl acetoacetate, acetylacetone, etc.

d. Alcohol type blocking agent

Methanol, ethanol, n-propyl alcohol, isopropyl alcohol, n-butyl alcohol, isobutyl alcohol, tert-butyl alcohol, n-amyl alcohol, tert-amyl alcohol, lauryl alcohol, ethylene glycol monomethyl ether, ethylene glycol mono-ethyl ether, ethylene glycol monobutyl ether, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrin, ethylene bromohydrin, 1,3-dichloro-2-propanol, ω-hydroperfluoro-alcohol, aceto-cyanohydrin, etc.

e. Mercaptan type blocking agent

Butylmercaptan, hexylmercaptan, tert-butyl-mercaptan, tert-dodecylmercaptan, 2-mercaptobenzothiazole, thiophenol, methylthiophenol, ethylthiophenol, etc.

f. Acid amide type blocking agent

Acetoanilide, acetonanisidide, acetotoluide, acrylamide, methacrylamide, acetamide, stearylamide, benzamide, etc.

g. Imide type blocking agent

Succinimide, phthalimide, maleimide, etc.

h. Amine type blocking agent

Diphenyl amine, phenylnaphthyl amine, xylidine, N-phenylxylidine, carbazole, aniline, naphthyl amine, butyl amine, dibutyl amine, butylphenyl amine, etc.

i. Imidazole type blocking agent

Imidazole, 2-ethylimidazole, etc.

j. Urea type blocking agent

Urea, thiourea, ethylene urea, ethylene thiourea, 1,3-diphenyl-urea, etc.

k. Carbamate type blocking agent

Phenyl N-phenylcarbamate, 2-oxazolidone, etc.

l. Imine type blocking agent

Ethyleneimine, etc.

m. Oxime type blocking agent

Formaldoxime, acetaldoxime, acetoxime, methyl ethyl ketoxime, diacetyl monoxime, benzophenone oxime, cyclohexanone oxime, etc.

n. Sulfite type blocking agent

Sodium bisulfite, potassium bisulfite, etc.

The "$\alpha,\beta$-ethylenically unsaturated monomer (monomer A)" to be used in this invention is a monomer containing a copolymerizable double bond >C=C< in the molecule. As such monomer, there may be exemplified (a) nitrile type monomers such as acrylonitrile, methacrylonitrile and fumaronitrile; (b) allyl type monomers such as allyl acetate, diallyl acetate, allyl chloride, allyl alcohol, 2-chloroallyl acetate, 2-chloroallyl chloride, methallyl acetate and methallyl chloride; (c) ethylene type monomers such as cis-dichloroethylene, trans-chloroethylene, tetrachloroethylene and trichloroethylene; (d) unsaturated dibasic acids such as maleic anhydride, diethyl maleate and fumaric acid; (e) unsaturated carboxylic acids such as acrylic acid, methacrylic acid and itaconic acid; (f) acrylic acid esters such as methyl acrylate, ethyl acrylate, n-propyl acrylate, isopropyl acrylate, n-butyl acrylate, isobutyl acrylate, tert-butyl acrylate, 2-ethylhexyl acrylate, lauryl acrylate, dodecyl acrylate, stearyl acrylate, cyclohexyl acrylate, dimethylaminoethyl acrylate, diethylaminoethyl acrylate and glycidyl acrylate; (g) methacrylic acid esters such as methyl methacrylate, ethyl methacrylate, n-propyl methacrylate, isopropyl methacrylate, n-butyl methacrylate, isobutyl methacrylate, tert-butyl methacrylate, 2-ethylhexyl methacrylate, lauryl methacrylate, dodecyl methacrylate, stearyl methacrylate, cyclohexyl methacrylate, dimethylaminoethyl methacrylate, diethylaminoethyl methacrylate and glycidyl methacrylate; (h) styrene type monomers such as styrene, vinyl toluene and $\alpha$-methylstyrene; (i) other monomers such as vinyl acetate, vinyl formate, vinyl propionate, vinyl stearate, divinylbenzene, di-isopropylbenzene, dimethyl itaconate, vinyl chloride and vinylidene chloride; and (j) hydroxyl group-containing unsaturated monomers such as 2-hydroxyethyl acrylate, 2-hydroxypropyl acrylate, 2-hydroxyethyl methacrylate, 2-hydroxypropyl methacrylate and N-methylol acrylamide.

These monomers may be used singly or in the form of admixtures of two or more of them.

In case such copolymerizable monomer is solid at room temperature, it is necessary to use the monomer incorporated and dissolved in another monomer that is liquid at room temperature.

In case two or more copolymerizable monomers are employed in combination, it is preferred that an alkyl ester of acrylic or methacrylic acid having 1 to 3 carbon atoms in the alkyl portion, a vinyl ester monomer having 3 to 5 carbon atoms in the alkyl portion, or a styrene type monomer be used in an amount greater than 20% by weight of the total monomers.

When commercially available products of these co-polymerizable monomers are employed, it is not always necessary to exclude therefrom polymerization intiators usually found in commercially available products, such as hydroquinone.

The thermosetting polymer dispersion of this invention is prepared by employing the foregoing components according to the following methods.

(I) In case the component solvated in the organic liquid contains a group capable of releasing an isocyanate group under heating, (1) at least one copolymerizable, $\alpha,\beta$-ethylenically unsaturated monomer (monomer A) or (2) at least one copolymerizable, $\alpha,\beta$-ethylenically unsaturated monomer (monomer A) and at least one latent isocyanate-containing, unsaturated monomer are polymerized in the organic liquid in the presence of said solvated component.

As is seen from the object of this invention, it is indispensable that the active hydrogen atom to be reacted with the isocyanate group released under heating should be present in the polymer dispersion and therefore, an active hydrogen-containing group such as a hydroxyl group should be contained in at least one or the solvated component, the monomer (A) and the latent isocyanate-containing, unsaturated monomer.

(II) In case the component solvated in the organic liquid is free of a group capable of releasing an isocyanate group under heating, at least one copolymerizable, $\alpha,\beta$-ethylenically unsaturated monomer (monomer A) and at least one latent isocyanate-containing, unsaturated monomer are polymerized in the organic liquid in the presence of said solvated component.

As in the foregoing case, it is indispensable in this case that at least one of the solvated components, the monomer A and the latent isocyanate-containing, unsaturated monomer should have an active hydrogen atom.

In the above methods (I) and (II), it is possible to synthesize in advance a solvated component in a vessel charged with an organic liquid and then add other components, i.e., a monomer A and/or a latent-isocyanate-containing, unsaturated monomer and react them.

In each of the foregoing methods (I) and (II), the component solvated in the organic liquid acts as a so-called stabilizer and hence, polymer particles insoluble in the organic liquid can be dispersed in the organic liquid in a very stable state.

A radical initiator may be used for the preparation of polymer dispersions. As the radical initiator there may be mentioned, for instance, organic peroxide initiators such as benzoyl peroxide, lauroyl peroxide, cumene hydroperoxide, di-tert-butyl peroxide and acetyl peroxide, and nitrile type initiators such as $\alpha,\alpha'$-azobisisobutyronitrile. The amount of the initiator is 0.01 to 3% by weight, preferably 0.5 to 1% by weight, based on the total monomers.

In carrying out the process of this invention, the reaction temperature is 50° to 140°C, preferably 70° to 100°C, and the polymerization time is preferably 1 to 10 hours. The addition of copolymerizable monomers may be accomplished in two or three portions. It is preferred that nitrogen be introduced into a reaction vessel during the polymerization, but introduction of nitrogen is not always necessary. In some special cases, for instance, in case gaseous monomers are employed, the reaction may be carried out under pressure.

In the polymer dispersions obtained according to this invention, the average size of the dispersed particles is within a range of from 0.1 to 10$\mu$.

The polymer dispersions obtained according to this invention are self-cross-linkable polymer dispersions in which the latent isocyanate group and active hydrogen-containing group are contained in the component solvated in the organic liquid, namely the stabilizer, and in some cases, the active hydrogen-containing group is contained also in the dispersed polymer. In this synthetic polymer dispersion, the latent isocyanate group and active hydrogen-containing group are generally present at a latent isocyanate group/active hydrogen-containing group ratio of about 0.3 to about 2.0, preferably 0.5 to 1.3.

The thus formed polymer dispersion, if desired, can be formed into a powdery coating composition by spray drying.

When such powdery coating composition is prepared, it is desirable that the non-volatile content of the polymer dispersion be adjusted to 20 to 65% by weight and then the polymer dispersion is subjected to spray drying. In case the non-volatile content is lower than 20% by weight, the spraying efficiency is extremely lowered, and when the non-volatile content exceeds 65% by weight, the particle size distribution is broadened in the resulting powder particles and the average particle size becomes large. Therefore, too high or too low a non-volatile content is not preferred.

In this invention, the spray drying can be performed by means of a known spary drier, and it is desirable that the inlet temperature be higher than the boiling point of the organic liquid. In order to improve the blocking property of the powder and attain a good dry condition, the inlet temperature is generally maintained at a level exceeding 100°C. Further, it is also desirable that the outlet temperature be lower than the dissociation point and softening point of the polymer in the dispersion and it is generally maintained at a level lower than 100°C. The thus obtained powdery coating composition has a particle size of 0.01 to 100μ, preferably 5 to 200μ.

In order to improve the blocking property during storage and the flow characteristic at the baking step in the powdery coating composition of this invention, the component solvated in the organic liquid and each monomer component are so selected that the glass transition point (Tg) of the resulting particles is 30° to 120°C, preferably 40° to 100°C. In case said glass transition point (Tg) is lower than 30°C, the storage stability is lowered and when said glass transition point (Tg) is higher than 120°C, the surface of the film obtained by the baking operation lacks smoothness.

In order to improve the storage stability and the flow characteristic at the baking step in the powdery coating composition of this invention, it is preferred that the resulting particles have a molecular weight of 1,000 to 20,000, especially 3,000 to 10,000.

When the above polymer dispersion of powdery composition used as a coating composition is heated at 100° to 250°C for 10 to 60 minutes, the blocking agent is released from the latent isocyanate group to form a free isocyanate group, whereby the dispersed polymer particles or powder particles are fused and adhere to one another and they simultaneously react with the active hydrogen-containing group to form a three-dimensional polymer.

Accordingly, in the coating composition of this invention, a three-dimensional polymer can be formed only by heating it without incorporation of a particular active hydrogen-containing substance, but it is possible to employ in combination an active hydrogen-containing resin according to need.

In the coating composition of this invention, it is possible to add an organic or inorganic pigment, a releasing catalyst (same as those exemplified above as the catalyst for the masking reaction, for instance, tertiary amines and organotin compounds), a levelling agent, a drier, an extender and the like.

Films having excellent gloss, water resistance, chemical resistance, weatherability, solvent resistance and other properties can be prepared from the coating composition of this invention.

The coating composition may be applied on a substrate such as a plate of a metal, e.g., iron, aluminum, zinc and zinc-plated steel, plywood, wooden board, paper, cloth, fabrics and plastics.

In the coating composition of this invention, each particle has the latent isocyanate group and active hydrogen-containing group as a cross-linking components, but since the isocyanate group is masked or blocked, a good dispersion state can be kept during the synthesis reaction and the resulting coating composition has an excellent storage stability. Therefore, the coating composition of this invention exhibits a high reactivity at the time of curing and gives a heat-set film which is tough and has excellent properties.

This invention will now be illustrated more concretely by reference to Examples, in which all of "parts" and "percentages" are on the weight basis, unless otherwise indicated.

Examples illustrating the preparation of latent isocyanate-containing monomers to be used in this invention are described.

EXAMPLE 1

A reaction vessel equipped with a dropping funnel, a stirrer, a thermometer and a cooling tube was charged with 100 parts of 2,4-tolylene diisocyanate and 100 parts of dioxane, and a mixture of 54 parts of phenol, 54 parts of toluene and 0.5 part of triethylamine was added dropwise over a period of 30 minutes while maintaining the reaction temperature at 30°C. Then, the reaction mixture was maintained at 45°C for 10 minutes to complete the reaction. Then, 74.9 parts of 2-hydroxyethyl methacrylate, 74.9 parts of dioxane and a minute amount of m-dinitrobenzene were added to the reaction mixture, and it was maintained at 60°C for 40 minutes. The resulting reaction solution was put into a great excess of petroleum ether to obtain a white powdery, latent isocyanate-containing, unsaturated monomer (I).

In the same manner as described above, a latent isocyanate-containing, unsaturated monomer (II) was prepared from 110 parts of hydrogenated xylene diisocyanate, 74.9 parts of 2-hydroxyethylmethacrylate and 55 parts of methylethylketoxime.

In the same manner as described above, a latent isocyanate-containing, unsaturated monomer (II) was prepared from 97 parts of hexamethylene diisocyanate, 83 parts of 2-hydroxypropyl methacrylate and 27 parts of ethanol.

In the same manner as described above, a latent isocyanate-containing, unsaturated monomer (IV) was prepared from 100 parts of 2,4-tolylene diisocyanate, 65 parts of ε-caprolactam and 74.9 parts of 2-hydroxyethyl methacrylate.

In the same manner as described above, a latent isocyanate-containing, unsaturated monomer (V) was prepared from 150 parts of 4,4'-methylenebis(cyclohexyl isocyanate), 65 parts of cyclohexanone oxime and 74.9 parts of 2-hydroxyethyl methacrylate.

EXAMPLE 2

A round-bottom flask equipped with a cooler was charged with 44 parts of methacrylic acid, 0.5 part of hydroquinone and 90 parts of thionyl chloride, and they were reacted for 24 hours in a dark cold place. Then, the temperature was elevated to 45°C, and this temperature was maintained for 30 minutes. After completion of the reaction, the reaction mixture was cooled and excess thionyl chloride was removed by distillation under reduced pressure to obtain methacryloyl chloride. Separately, a reaction vessel equipped with a stirrer, a dropping funnel and a cooler was charged with 25 parts of sodium azide, 40 parts of ethyl alcohol and 60 parts of xylene, and the mixture was agitated for a while. The above methacryloyl chloride was promptly added dropwise to the above mixture, and the temperature was gradually elevated and maintained at 50° to 60°C under agitation. Nitrogen gas was generated and the reaction was completed within 4 hours. The reaction product mixture was cooled to room temperature and precipitated crystals of sodium chloride were separated therefrom to obtain a latent isocyanate-containing, unsaturated monomer (VI).

In the same manner as described above except that 40 parts of ethyl alcohol was replaced by 75.6 parts of methylethylketoxime, 82 parts of phenol, 130 parts of cyclohexanone oxime or 70 parts of ε-captolactam, there were prepared latent isocyanate-containing, unsaturated monomers (VII), (VIII), (IX) and (X).

Components solvated in an organic liquid, which are used in this invention, are now described more specifically.

EXAMPLE 3 a. A cotton seed oil-modified, medium oil alkyd resin composed of cotton seed oil fatty acid, phthalic anhydride, pentaerythritol and ethylene glycol and having a non-volatile content of 50%, a viscosity of V as measured according to the Gardner-Holdt method at 20°C, an oil length of 55%, an acid value of 8 (as measured with respect to the solids) and an OH value of 65 (as measured with respect to the solids) (hereinafter referred to as "solvated component $a$").

b. A tall oil-modified, medium oil alkyd resin composed of tall oil fatty acid, phthalic anhydride, pentaerythritol and ethylene glycol and having a non-volatile content of 50%, a viscosity of $Z_5$ as measured according to the Gardner-Holdt method at 20°C, an oil length of 45%, an acid value of 8.5 (as measured with respect to the solids) and an OH value of 95 (as measured with respect to the solids (hereinafter referred to as "solvated component $b$").

c. A cotton seed oil-modified, short oil alkyd resin composed of cotton seed oil fatty acid, phthalic anhydride, pentaerythritol and trimethylol propane and having a non-volatile content of 50%, a viscosity of X as measured according to the Gardner-Holdt method at 20°C, an oil length of 30%, an acid value of 8 (as measured with respect to the solids) and an OH value of 130 (as measured with respect to the solids (hereinafter referred to as "solvated component $c$").

d. A linseed oil fatty acid-modified epoxy-modified alkyd resin having a non-volatile content of 50%, an oil length of 57%, an acid value of 6 (as measured with respect to the solids), an OH value of 3.5 (as measured with respect to the solids) and a viscosity of S-T as measured according to the Gardner-Holdt method at 20°C. (hereinafter referred to as "solvated component $d$").

e. A reaction vessel was charged with 45 parts of 2-ethylhexyl acrylate, 0.45 part of benzoyl peroxide and 60 parts of n-heptane, and after the inside atmosphere was replaced by nitrogen, they were reacted at 80° – 83°C for about 2 hours to obtain a polymer dissolved in n-heptane (hereinafter referred to as "solvated component $e$").

f. A reaction vessel was charged with 10 parts of trimethylamine methacrylimide, 35 parts of 2-ethylhexyl acrylate, 0.45 part of benzoyl peroxide, 10 parts of isopropyl alcohol and 50 parts of mineral spirits, and after the inside atmosphere was replaced by nitrogen, they were reacted at 80° – 83°C for about 2 hours to obtain a copolymer (hereinafter referred to as "solvated component $f$").

g. A reaction vessel was charged with 10 parts of 1,1-dimethyl-1,1-(2-hydroxypropyl)amine methacrylamide, 35 parts of 2-ethylhexyl acrylate, 0.45 part of benzoyl peroxide, 10 parts of isopropyl alcohol and 50 parts of mineral spirits, and after the inside atmosphere was replaced by nitrogen, they were reacted at 80° – 83°C for about 3 hours to obtain a copolymer (hereinafter referred to as "solvated component $g$").

h. A reaction vessel was charged with 10 parts of ethyl acrylate, 30 parts of lauryl methacrylate, 5 parts of the above latent isocyanate-containing, unsaturated monomer (I), 10 parts of isopropyl alcohol, 50 parts of VM&P naphtha and 0.45 part of benzoyl peroxide, and they were reacted at 80° – 83°C for about 3 hours to obtain a copolymer (hereinafter referred to as "solvated component $h$").

i. A reaction vessel was charged with 38 parts of lauryl methacrylate, 7 parts of 2-hydroxyethyl acrylate, 170 parts of mineral spirits and 0.45 part of benzoyl peroxide, and they were reacted at 80° – 83°C for about 2 hours to obtain a copolymer (hereinafter referred to as "solvated component $i$").

j. A reaction vessel was charged with 40 parts of 2-ethylhexyl acrylate, 5 parts of 2-hydroxyethyl methacrylate, 0.45 part of benzoyl peroxide and 170 parts of rubber volatile, and they were reacted at 80° – 83°C for about 2 hours to obtain a copolymer (hereinafter referred to as "solvated component $j$").

k. A reaction vessel was charged with 40 parts of lauryl methacrylate, 5 parts of the above latent isocyanate-containing, unsaturated monomer (VI), 0.45 part of benzoyl peroxide, 10 parts of isopropyl alcohol and 160 parts of n-heptane, and after the inside atmosphere was replaced by nitrogen, they were reacted at 80° – 83°C for 3 hours to obtain a copolymer (hereinafter referred to as "solvated component $k$").

l. Under the same reaction conditions as in (k) above, 37 parts of dodecyl acrylate, 3 parts of 2-hydroxyethyl acrylate, 5 parts of 1,1-dimethyl-1,1-(2-hydroxypropyl)amine methacrylamide, 10 parts of ethyl alcohol, 170 parts of mineral spirit and 0.45 part of benzoyl peroxide were reacted to obtain a copolymer (hereinafter referred to as "solvated component $l$").

m. Under the same reaction conditions as in (k) above, 30 parts of stearyl methacrylate, 5 parts of the above latent isocyanate-containing, unsaturated monomer (I), 10 parts of 2-hydroxyethyl acrylate, 15 parts of ethyl alcohol, 160 parts of n-heptane and 0.45 part of benzoyl peroxide were reacted to obtain a copolymer (hereinafter referred to as "solvated component m").

n. Under the same reaction conditions as in (k) above, 37 parts of dodecyl acrylate, 3 parts of 2-hydroxyethyl acrylate, 5 parts of the above latent isocyanatecontaining monomer (IX), 10 parts of ethyl alcohol, 170 parts of ethylcyclohexane and 0.45 part of benzoyl peroxide were reacted to obtain a copolymer (hereinafter referred to as "solvated component n").

o. Under the same conditions as in (k) above, 30 parts of butyl methacrylate, 5 parts of 2-hydroxyethyl acrylate, 5 parts of the above latent isocyanate-containing, unsaturated monomer (X), 15 parts of ethyl alcohol, 145 parts of rubber volatile and 0.4 part of benzoyl peroxide were reacted to obtain a copolymer (hereinafter referred to as "solvated component o").

Examples illustrating the preparation of thermosetting coating compositions are described.

EXAMPLE 4

A reaction vessel was charged with 2,000 parts of the cotton seed oil-modified, medium oil alkyd resin solution having a non-volatile content of 50% (solvated component $a$) and 890 parts of mineral spirits, and after the inside atmosphere was replaced by nitrogen, the temperature was elevated to 80°C. Then, a mixture of 150 parts of 2-hydroxyethyl methacrylate, 400 parts of methyl methacrylate, 340 parts of ethyl acrylate, 220 parts of the above latent isocyanate-containing, unsaturated monomer (I), 220 parts of xylene and 11 parts of benzoyl peroxide, which had been charged in a dropping funnel of the reaction vessel and maintained at 80° – 83°C, was added dropwise over a period of about 2 hours. After completion of the dropwise addition, the reaction was carried out at 80°– 83°C for 6 hours to obtain a milky white synthetic polymer dispersion. When the thus obtained synthetic polymer dispersion was coated on a metal plate and baked at 160° C for 30 minutes, the blocked isocynate was decomposed to form a free isocynate and it reacted with the hydroxyl groups contained in the alkyd resin with acrylilc resin, whereby a cross-linked, transparent, cured film having a solvent resistance and a smooth surface was obtained. Even when this polymer dispersion was stored for 6 months, no sedimentation or phase separation was observed.

EXAMPLE 5

A reaction vessel was charged with 2,000 parts of the tall oil-modified, medium oil alkyd resin solution having a non-volatile content of 50% (solvated component $b$) and 800 parts of mineral spirits, and after the inside atmosphere was replaced by nitrogen, the temperature was elevated to 80°C. Then, a mixture of 440 parts of methyl methacrylate, 100 parts of acrylonitrile, 300 parts of ethyl acrylate, 130 parts of 1,1-dimethyl-1-(2-hydroxypropyl)amine methacrylimide, 10 parts of dibutyltin dilaurate, 10 parts of benzoyl peroxide and 200 parts of isopropyl alcohol, which had been charged in advance in a dropping funnel of the reaction vessel and maintained at 80° – 83°C, was added dropwise over a period of 2 hours. After completion of the dropwise addition, the reaction was carried out at 80° – 83°C for 6 hours to obtain a milky white synthetic polymer dispersion. When the thus obtained synthetic polymer dispersion was coated on a substrate and baked at 140°C for 30 minutes, a film having as good properties as those of the film of Example 4 was obtained.

EXAMPLE 6

A reaction vessel was charged with 2,000 parts of the cotton seed oil-modified alkyd resin solution having a non-volatile content of 50% (solvated component $c$) and 1,110 parts of mineral spirits, and after the inside atmosphere was replaced by nitrogen, the temperature was elevated to 80°C. Then, a mixture of 400 parts of methyl methacrylate, 340 parts of ethyl acrylate, 150 parts of 2-ethylhexyl acrylate, 220 parts of the above latent-isocyanate-containing, unsaturated monomer (VI) and 11 parts of benzoyl peroxide, which had been charged in advance in a dropping funnel of the reaction vessel and maintained at 80° – 83°C, was added dropwise over a period of about 2 hours. After completion of the dropwise addition, the reaction was carried out at 80° – 83°C for 6 hours to obtain a milky white synthetic polymer dispersion. When the thus obtained synthetic polymer was coated and baked at 160°C for 30 minutes, a film having as good properties as those of the film of Example 4 was obtained.

EXAMPLE 7

A reaction vessel was charged with 2,000 parts of the epoxy-modified alkyd resin solution having a non-volatile content of 50% (solvated component $d$) and 1,000 parts of mineral spirits, and after the inside atmosphere was replaced by nitrogen, the temperature was elevated to 80°C. Then, a mixture of 260 parts of 2-hydroxyethyl methacrylate, 400 parts of methyl methacrylate, 340 parts of ethyl acrylate, 210 parts of the above latent isocyanate-containing, unsaturated monomer (II) and 12 parts of benzoyl peroxide, which had been charged in advance in a dropping funnel of the reaction vessel and maintained at 80° – 83°C, was added dropwise over a period of about 2 hours. After completion of the dropwise addition, the reaction was carried out at 80° – 83°C for 6 hours to obtain a milky white synthetic polymer dispersion. When the thus obtained dispersion was coated and baked at 160°C for 30 minutes, a film having as good properties as those of the film of Example 4 was obtained.

EXAMPLE 8

A reaction vessel was charged with 40 parts of pale crepe rubber (20% mineral spirits solution) and 111 parts of mineral spirits, and after the inside atmosphere was replaced by nitrogen, the temperature was elevated to 80°C. Then, a mixture of 25 parts of methyl methacrylate, 54 parts of ethyl acrylate, 10 parts of 2-hydroxyethyl acrylate, 9 parts of the above latent isocyanate-containing, unsaturated monomer (VII) and 1 part of benzoyl peroxide, which had been charged in advance in a dropping funnel of the reaction vessel and maintained at 80° – 83°C, was added dropwise over a period of about 2 hours. After completion of the dropwise addition, the reaction was carried out at 80° – 83°C for 6 hours to obtain a milky white synthetic polymer dispersion. When the thus obtained dispersion was coated and baked at 140°C for 30 minutes, a film having good properties was obtained.

EXAMPLE 9

A reaction vessel was charged with 100 parts of the soluble copolymer solution having a non-volatile content of 42% (solvated component $e$), and after the inside atmosphere was replaced by nitrogen, a mixture of 5 parts of 2-hydroxyethyl acrylate, 5 parts of the above latent isocyanate-containing, unsaturated monomer (VIII), 10 parts of butyl acrylate, 25 parts of methyl methacrylate, 120 parts of mineral spirits and 0.45 part of benzoyl peroxide, which had been charged in advance in a dropping funnel of the reaction vessel and maintained at 80° – 83°C, was added dropwise over a period of 1 hour. The reaction was further continued at 80° – 83°C for 6 hours to obtain a milky white, stable dispersion. When this dispersion was coated on an iron plate and baked at 180°C for 30 minutes, the released isocyanate reacted with the hydroxyl group and film having a good solvent resistance was obtained.

EXAMPLE 10

A reaction vessel was charged with 75 parts of 2-ethylhexyl acrylate, 30 parts of methyl methacrylate, 15 parts of ethyl acrylate, 15 parts of 2-hydroxyethyl acrylate, 15 parts of trimethylamine methacrylamide, 1.5 parts of benzoyl peroxide, 20 parts of isopropyl alcohol and 130 parts of n-heptane, and after the inside atmosphere was replaced by nitrogen, the temperature was elevated to 80°C. Then, the reaction was continued at 80° – 83°C for about 10 hours to obtain a milky white dispersion. When this dispersion was coated on an iron plate and baked at 180°C for 30 minutes, the active isocyanate group was cross-linked with the hydroxyl group and a film having good properties was obtained.

EXAMPLE 11

A reaction vessel was charged with 105 parts of the soluble vinyl copolymer solution having a non-volatile content of 42% (solvated component $f$) and after the inside atmosphere was replaced by nitrogen, a mixture of 10 parts of 2-ethylhexyl acrylate, 5 parts of 2-hydroxyethyl acrylate, 30 parts of methyl methacrylate, 120 parts of mineral spirits and 0.45 part of benzoyl peroxide, which had been charged in advance in a dropping funnel of the reaction vessel and maintained at 80° – 83°C, was added dropwise over a period of 1 hour. The reaction was continued at 80° – 83°C for 6 hours to obtain a milky white, stable dispersion. When this dispersion was coated on an iron plate and baked at 180°C for 30 minutes, a film having good properties was obtained.

EXAMPLE 12

A reaction vessel was charged with 105 parts of the soluble vinyl copolymer solution having a non-volatile content of 42% (solvated component $g$), and after the inside atmosphere was replaced by nitrogen, a mixture of 10 parts of 2-ethylhexyl acrylate, 10 parts of ethyl acrylate, 25 parts of methyl methacrylate, 120 parts of mineral spirit and 0.45 part of benzoyl peroxide, which had been charged in advance in a dropping funnel of the reaction vessel and maintained at 80° – 83°C, was added dropwise. The reaction was continued at this temperature for 6 hours to obtain a milky white, stable dispersion. When this dispersion was coated on an iron plate and baked at 180°C for 30 minutes, a film having good properties was obtained.

EXAMPLE 13

A reaction vessel was charged with 105 parts of the vinyl copolymer solution having a non-volatile content of 42% (solvated component $h$), and after the inside atmosphere was replaced by nitrogen, a mixture of 5 parts of 2-hydroxyethyl acrylate, 10 parts of methyl methacrylate, 30 parts of butyl acrylate, 0.45 part of benzoyl peroxide and 120 parts of n-heptane, which had been charged in advance in a dropping funnel of the reaction vessel and maintained at 80° – 83°C, was added dropwise over a period of 1 hour. The reaction was continued at this temperature for 6 hours to obtain a milky white dispersion. When this dispersion was coated on an iron plate and baked at 180°C for 30 minutes, the released isocyanate reacted with the hydroxyl group and a film having good properties was obtained.

EXAMPLE 14

A reaction vessel was charged with 215 parts of the vinyl copolymer solution having a non-volatile content of 21% (solvated component $i$), and after the inside atmosphere was replaced by nitrogen, a mixture of 5 parts of the above latent isocyanate-containing, unsaturated monomer (VI), 30 parts of butyl acrylate, 10 parts of methyl methacrylate, 10 parts of isopropyl alcohol and 0.45 part of benzoyl peroxide, which had been charged in advance in a dropping funnel of the reaction vessel and maintained at 80° – 83°C, was added dropwise over a period of 1 hour. The reaction was contained at this temperature for 6 hours to obtain a milky white dispersion. When this dispersion was coated on an iron plate and baked at 180°C for 30 minutes, the released isocyanate reacted with the hydroxyl group and a film having good properties was obtained.

EXAMPLE 15

A reaction vessel was charged with 215 parts of the vinyl copolymer solution having a non-volatile content of 21% (solvated component $j$), and after the inside atmosphere was replaced by nitrogen, a mixture of 5 parts of trimethylamine methacrylamide, 25 parts of methyl methacrylate, 15 parts of butyl acrylate, 10 parts of isopropyl alcohol and 0.45 part of benzoyl peroxide, which had been charged in advance in a dropping funnel of the reaction vessel and maintained at 80° – 83°C, was added dropwise over a period of 1 hour. The reaction was continued at this temperature for 6 hours to obtain a milky white dispersion. When this dispersion was coated on an iron plate and baked at 180°C for 30 minutes, the released isocyanate reacted with the hydroxyl group and a film having good properties was obtained.

EXAMPLE 16

A reaction vessel was charged with 215 parts of the vinyl copolymer solution having a non-volatile content of 21% (solvated component $k$), and after the inside atmosphere was replaced by nitrogen, a mixture of 5 parts of the above latent isocyanate-containing, unsaturated monomer (III), 10 parts of 2-hydroxyethyl methacrylate, 30 parts of methyl methacrylate and 10 parts of ethanol, which had been charged in advance in a dropping funnel of the reaction vessel and maintained at 80° – 83°C, was added dropwise over a period of 1 hour. Then, the reaction was continued at this temperature for 6 hours to obtain a milky white dispersion. When this dispersion was coated on an iron plate and baked at 180°C for 30 minutes, the released isocyanate reacted with the hydroxyl group and a film having good properties was obtained.

EXAMPLE 17

A reaction vessel was charged with 225 parts of the vinyl copolymer solution having a non-volatile content of 20% (solvated component $l$), and after the inside atmosphere was replaced by nitrogen, a mixture of 2 parts of 2-hydroxyethyl acrylate, 23 parts of styrene and 20 parts of ethyl acrylate, which had been charged in advance in a dropping funnel of the reaction vessel and maintained at 80° – 83°C, was added dropwise over a period of 1 hour. Then, the reaction was continued at this temperature for 6 hours to obtain a milky white dispersion. When this dispersion was coated on an iron plate and baked at 180°C for 30 minutes, the released isocyanate reacted with the hydroxyl group and a film having good properties was obtained.

EXAMPLE 18

A reaction vessel was charged with 220 parts of the vinyl copolymer solution having a non-volatile content of 20% (solvated compound $m$), and after the inside atmosphere was replaced by nitrogen, a mixture of 2 parts of the above latent isocyanate-containing, unsaturated monomer (II), 30 parts of butyl acrylate, 13 parts of methyl methacrylate, 5 parts of isopropyl alcohol and 0.45 part of benzoyl peroxide, which had been charged in advance in a dropping funnel of the reaction vessel and maintained at 80° – 83°C, was added dropwise over a period of 1 hour. The reaction was continued at this temperature for 6 hours to obtain a milky white polymer dispersion. When this dispersion was coated on an iron plate and baked at 180°C for 30 minutes, the released isocyanate reacted with the hydroxyl group and a film having good properties was obtained.

EXAMPLE 19

A reaction vessel was charged with 27 parts of the soluble copolymer solution having a non-volatile content of 42% (solvated component $e$) and 80 parts of mineral spirits and after the inside atmosphere was replaced by nitrogen, a mixture of 10 parts of 2-hydroxyethyl acrylate, 20 parts of the above latent isocyanate-containing, unsaturated monomer (IV), 70 parts of methyl methacrylate, 1.0 part of benzoyl peroxide and 20 parts of isopropyl alcohol, which had been charged in advance in a dropping funnel of the reaction vessel and maintained at 80° – 83°C, was added dropwise over a period of 1 hour. Then, the reaction was continued at this temperature for 6 hours to obtain a milky white dispersion having a non-volatile content of 49%.

Then, 2 parts of dimethyl tin dilaurate and 1 part of Modaflaw (trademark for a flow adjusting agent manufactured by Monsanto Chemicals) were uniformly dispersed in the so obtained dispersion, and the resulting dispersion was spray dried at an inlet temperature of 200°C and an outlet temperature of 75°C to obtain a powdery coating composition having an average particle size of 50$\mu$ and a glass transition point of 54°C and having excellent flowability. When the composition was coated on a steel plate according to the electrostatic powder coated method and baked at 180°C for 30 minutes, a smooth film having excellent flexibility was obtained.

EXAMPLE 20

A reaction vessel was charged with 70 parts of the cotton seed oil-modified, short oil alkyd resin solution having a non-volatile content of 50% (solvated component $c$) and 70 parts of n-heptane, and after the inside atmosphere was replaced by nitrogen, the temperature was elevated to 80°C. Then, a mixture of 10 parts of 2-hydroxyethyl acrylate, 25 parts of the above latent isocyanate-containing, unsaturated monomer (V), 1.0 part of azobisisobutyronitrile, 30 parts of isopropyl alcohol and 65 parts of styrene, which had been charged in advance in a dropping funnel of the reaction vessel and maintained at 80° – 83°C, was added dropwise over a period of 2 hours, and the reaction was continued at the above temperature for 6 hours to obtain a milky white dispersion having a non-volatile content of 50%. The thus obtained dispersion was spray dried at an inlet temperature of 180°C and an outlet temperature of 70°C to obtain a powdery coating composition having an average particle size of 150$\mu$ and a glass transition point of 65°C and having excellent flowability. When this composition was coated on a pre-heated iron plate according to the fluidized bed coating method and baked at 180°C for 30 minutes, a smooth film having excellent properties was obtained.

EXAMPLE 21

A reaction vessel was charged with 100 parts of the soluble copolymer solution having a non-volatile content of 21% (solvated component $j$), and after the inside atmosphere was replaced by nitrogen, a mixture of 10 parts of the above latent isocyanate-containing, unsaturated monomer (IX), 30 parts of acrylonitrile, 60 parts of methyl methacrylate, 1.0 part of benzoyl peroxide, 33 parts of ethyl cellosolve and 70 parts of rubber volatile, which had been charged in advance in a dropping funnel of the reaction vessel and maintained at 80° – 83°C, was added dropwise over a period of 2 hours. The reaction was continued at the above temperature for 6 hours to obtain a milky white dispersion having a non-volatile content of 40%. The thus obtained dispersion was spray dried at an inlet temperature of 200°C and an outlet temperature of 70°C to obtain a powdery coating composition having an average particle size of 40$\mu$ and a glass transition point of 47°C and being composed of spherical particles having excellent flowability.

EXAMPLE 22

A reaction vessel was charged with 10 parts of 2-ethylhexyl acrylate, 5 parts of 2-hydroxyethyl acrylate, 5 parts of the above latent isocyanate-containing, unsaturated monomer (X), 80 parts of methyl methacrylate, 1.0 part of benzoyl peroxide, 40 parts of isopropyl alcohol and 60 parts of rubber volatile, and after the inside atmosphere was replaced by nitrogen, the temperature was elevated to 80°C. Then, the reaction was continued at 80° – 83°C for about 10 hours to obtain a milky white dispersion having a non-volatile content of 50%. The thus obtained dispersion was spray dried at an inlet temperature of 190°C and an outlet temperature of 75°C to obtain a powdery coating composition having an average particle size of 100$\mu$ and a glass transition point of 64°C and composed of spherical particles having excellent flowability and storage stability. When the thus obtained composition was coated on an iron plate according to the electrostatic powder coating method and baked at 180°C for 20 minutes, a film having good properties was obtained.

EXAMPLE 23

A reaction vessel was charged with 40 parts of the copolymer solution having a non-volatile content of 21% (solvated component $i$) and 80 parts of ethylcyclohexanone, and after the inside atmosphere was replaced by nitrogen, a mixture of 10 parts of 2-hydroxyethyl acrylate, 10 parts of the above latent isocyanate-containing, unsaturated monomer (IX), 80 parts of methyl methacrylate, 1.0 part of benzoyl peroxide and 20 parts of isopropyl alcohol, which had been charged in advance in a dropping funnel of the reaction vessel and maintained at 80° – 83°C, was added dropwise over a period of 2 hours.

The reaction was carried out at 80° – 83°C for 6 hours to obtain a milky white dispersion having a non-volatile content of 45%. The thus obtained dispersion was spray dried at an inlet temperature of 180°C and an outlet temperature of 65°C to obtain a powdery coating composition having an average particle size of 80$\mu$ and a glass transition point of 58°C and having excellent flowability. When this composition was coated according to the fluidized bed coating method and baked at 180°C for 30 minutes, a smooth film having excellent properties was obtained.

EXAMPLE 24

A reaction vessel was charged with 100 parts of the vinyl copolymer solution having a non-volatile content of 21% (solvated component $j$), and after the inside atmosphere was replaced by nitrogen, a mixture of 5 parts of the above latent isocyanate-containing, unsaturated monomer (X), 5 parts of 2-hydroxyethyl acrylate, 40 parts of styrene, 40 parts of methyl methacrylate, 10 parts of butyl acrylate, 1.0 part of benzoyl peroxide, 20 parts of isopropyl alcohol and 80 parts of mineral spirits which had been charged in advance in a dropping funnel of the reaction vessel and maintained at 80° – 83°C, was added dropwise over a period of 2 hours. The reaction was continued at the above temperature for 6 hours to obtain a milky white dispersion having a non-volatile content of 40%. The thus obtained dispersion was spray dried at an inlet temperature of 180°C and an outlet temperature of 80°C. to obtain a powder coating composition having an average particle size of 100$\mu$ and a glass transition point of 42°C. When this composition was coated according to the electrostatic powder coating method and baked at 190°C for 20 minutes, a smooth film having excellent properties was obtained.

EXAMPLE 25

A reaction vessel was charged with 150 parts of the vinyl copolymer solution having a non-volatile content of 20% (solvated component $n$), and after the inside atmosphere was replaced by nitrogen, a mixture of 2 parts of 2-hydroxyethyl acrylate, 0.5 part of benzoyl peroxide and 38 parts of styrene, which had been charged in advance in a dropping funnel of the reaction vessel and maintained at 80° – 83°C, was added dropwise over a period of 1 hour. The reaction was continued for 6 hours at the above temperature to obtain a milky white dispersion having a non-volatile content of 37%. The thus obtained dispersion was spray dried to obtain a powdery coating composition having an average particle size of 50$\mu$ and a glass transition point of 72°C. When the thus obtained composition was coated on an iron plate according to the electrostatic powder coating method and baked at 180°C for 30 minutes, a smooth film having excellent properties was obtained.

EXAMPLE 26

A reaction vessel was charged with 200 parts of the vinyl copolymer solution having a non-volatile content of 20% (solvated component $o$), and after the inside atmosphere was replaced by nitrogen, a mixture of 2 parts of the above latent isocyanate-containing, unsaturated monomer (X), 48 parts of methyl methacrylate, 5 parts of ethyl alcohol and 0.5 part of benzoyl peroxide, which had been charged in advance in a dropping funnel of the reaction vessel and maintained at 80° – 83°C, was added dropwise over a period of 2 hours. The reaction was carried out at the above temperature for 6 hours to obtain a milky white dispersion having a non-volatile content of 30.5%. The thus obtained dispersion was spray dried at an inlet temperature of 180°C and an outlet temperature of 70°C to obtain a powdery coating composition having an average particle size of 70$\mu$ and a glass transition point of 100°C. When this composition was coated according to the electrostatic powder coating method and baked at 180°C for 30 minutes, a smooth film having excellent properties was obtained.

EXAMPLE 27

A reaction vessel was charged with 50 parts of the copolymer solution having a non-volatile content of 42.7% (solvated component $f$) and 100 parts of mineral spirts, and after the inside atmosphere was replaced by nitrogen, a mixture of 10 parts of 2-hydroxyethyl acrylate, 90 parts of methyl methacrylate and 1.0 part of benzoyl peroxide, which had been charged in advanced in a dropping funnel of the reaction vessel and maintained at 80° – 83°C, was added dropwise over a period of about 2 hours. The reaction was continued at the above temperature for 6 hours to obtain a milky white dispersion having a non-volatile content of 48.5%. The thus obtained composition was spray coated at an inlet temperature of 200°C and an outlet temperature of 80°C to obtain a powdery coating composition having an average particle size of 75$\mu$ and a glass transition point of 45°C. When the thus obtained powdery composition was coated according to the electrostatic powder coating method and baked at 170°C for 30 minutes, a smooth film having excellent properties was obtained.

EXAMPLE 28

A reaction vessel was charged with 30 parts of stearyl methacrylate, 5 parts of 2-hydroxyethyl acrylate, 15 parts of 1,1-dimethyl-1,1-(2-hydroxypropyl)amine methacrylimide, 50 parts of methyl methacrylate, 40 parts of ethyl cellosolve and 60 parts of ethylcyclohexanone, and after the inside atmosphere was replaced by nitrogen, the temperature was elevated to 80°C. Then, the reaction was conducted at 80° – 83°C for about 10 hours to obtain a milky white dispersion having a non-volatile content of 50%. The thus obtained dispersion was spray dried at an inlet temperature of 160°C and an outlet temperature of 65°C to obtain a powdery coating composition having an average particle size of 75μ and a glass transition point of 70°C and composed of spherical particles having excellent flowability and storage stability. When this composition was coated on an iron plate and baked at 180°C for 30 minutes, a smooth film having good properties was obtained.

What we claim is:

1. A thermosetting coating composition comprising
   A. an organic liquid of no polarity or a low dissolving powder as a dispersion medium, said organic liquid being capable of dissolving monomers but incapable of dissolving polymers formed from the monomers, and dispersed therein
   B. particles of a copolymer formed by copolymerization of (1) a copolymerizable, latent isocyanate containing, unsaturated monomer capable of releasing an isocyanate group under heating and (2) an α,β-ethylenically unsaturated monomer, a homopolymer of which is insoluble in said organic liquid, said copolymer particles having around the periphery thereof a component solvated in said organic liquid and compatible with said copolymer or chemically bonded to said copolymer selected from the group consisting of vinyl polymers having a molecular weight of about 1,000 to 20,000 and synthetic rubbers having a molecular weight of about 5,000 to 50,000 and selected from the group consisting of polyisobutylene, polyisoprene, polychloroprene, isoprene-isobutylene copolymers, polybutadiene, butadiene-styrene copolymers, butadieneacrylonitrile copolymers and butadiene-isobutylene copolymers, wherein at least one of said latent isocyanate-containing monomer, said α,β-ethylenically unsaturated monomer and said component solvated in said organic liquid contains an active hydrogen atom, the solvated component constitutes 5 to 65% by weight of the total dispersed solids, the average size of the dispersed particles is from 0.1 to 10μ, the ratio of latent isocyanate group/active hydrogen group is from 0.3 to 2.0, provided that when the vinyl polymer or synthetic rubber is used as the active hydrogen-containing component the OH value of the vinyl polymer or synthetic rubber is at least 10, and that when said vinyl polymer is used as the active hydrogen-containing component, said vinyl polymer is a copolymer formed from up to 10 mole% of an hydroxy group-containing monomer and at least 90 mole% of other vinyl monomer.

2. A coating composition set forth in claim 1 wherein copolymerizable, latent, isocyanate-containing, unsaturated mono capable of releasing an isocyanate group under heating constitute 3 to 80% by weight of the total solids of the composition.

3. A coating composition set forth in claim 1 wherein the component solvated in said organic liquid contains a latent isocyanate group capable of releasing an isocyanate group under heating.

4. A process for the preparation of thermosetting coating compositions, which comprises polymerizing at a temperature in the range of from 70° to 100°C. at least one copolymerizable, latent isocyanate-containing, unsaturated monomer capable of releasing an isocyanate group under heating in the range of from 100° to 250°C. for 10 to 60 minutes and at least one α,β-ethylenically unsaturated monomer in an organic liquid of no polarity or a low dissolving power capable of dissolving monomers but incapable of dissolving polymers formed from the monomers in the presence of a component solvated in said organic liquid selected from the group consisting of vinyl polymers having a molecular weight of about 1,000 to 20,000 and synthetic rubbers having a molecular weight of about 5,000 to 50,000 and selected from the group consisting of polyisobutylene, polyisoprene, polychloroprene, isoprene-isobutylene copolymers, polybutadiene, butadiene-styrene copolymers, butadiene-acrylonitrile copolymers and butadiene-isobutylene copolymers, a homopolymer of said α,β-ethylenically unsaturated monomer being insoluble in said organic liquid, wherein at least one of said component solvated in the organic liquid, said latent isocyanate-containing monomer and said α,β-ethylenically unsaturated monomer contains an active hydrogen atom, the solvated component constitutes 5 to 65% by weight of the total dispersed solids, the ratio of latent isocyanate group/active hydrogen group is from 0.3 to 2.0, provided that when the vinyl polymer or synthetic rubber is used as the active hydrogen-containing component the OH value of the vinyl polymer of synthetic rubber is at least 10 and that when said vinyl polymer is used as the active hydrogen-containing component, said vinyl polymer is a copolymer formed from up to 10 mole % of an hydroxy group-containing monomer and at least 90 mole % of other vinyl monomer, said polymerization temperature being lower than said isocyanate-releasing temperature.

5. A process according to claim 4 wherein the component solvated in said organic liquid contains a group capable of releasing an isocyanate group under heating.

6. A process according to claim 4 wherein the component solvated in said organic liquid is used in such an amount that it constitutes 5 to 90% by weight of the total solids of the resulting composition.

7. A process for the preparation of powdery thermosetting coating compositions, which comprises polymerizing at a temperature in the range of from 70° to 100°C. at least one copolymerizable, latent isocyanate-containing, unsaturated monomer capable of releasing an isocyanate group under heating in the range of from 100° to 250°C. for 10 to 60 minutes, and at least one α,β-ethylenically unsaturated monomer in an organic liquid of no polarity or a low dissolving power capable of dissolving monomers but incapable of dissolving polymers formed from the monomers in the presence of a component solvated in said organic liquid selected from the group consisting of vinyl polymers having a molecular weight of about 1,000 to 20,000 and synthetic rubbers having a molecular weight of about 5,000 to 50,000 and selected from the group consisting of polyisobutylene, polyisoprene, polychloroprene, isoprene-isobutylene copolymers, polybutadiene, butadiene-styrene copolymers, butadiene-acrylonitrile copolymers and butadiene-isobutylene copolymers, a homopolymer of said α,β-ethylenically unsaturated monomer being insoluble in said organic liquid and at least one of said solvated component, said latent isocyanate-containing monomer and said α,β-ethylenically unsaturated monomer containing an active hydrogen atom to form a polymer dispersion, and spray drying the polymer dispersion, wherein the solvated component constitutes 5 to 65% of weight of the total dispersed solids, the ratio of latent isocyanate group/active hydrogen group is from 0.3 to 2.0, provided that when the vinyl polymer or synthetic rubber is used as the active hydrogen-containing component the OH value of the vinyl polymer or synthetic rubber is at least 10, and that when said vinyl polymer is used as the active hydrogen-containing component, said vinyl polymer is a copolymer formed from up to 10 mole% of an hydroxy group-containing monomer and at least 90 mole% of other vinyl monomer, and that the monomers and solvated component are selected so that the glass transition point of the particles is 30° to 120°C, said polymerization temperature being lower than said isocyanate-releasing temperature.

8. A process according to claim 1 wherein said component solvated in said organic liquid contains a group capable of releasing an isocyanate group under heating.

9. A process for the preparation of thermosetting coating compositions, which comprises polymerizing at a temperature in the range of from 70° to 100°C. at least one α,β-ethylenically unsaturated monomer in an organic liquid of no polarity or a low dissolving power capable of dissolving monomers but incapable of dissolving polymers formed from the monomers in the presence of a component solvated in said organic liquid selected from the group consisting of vinyl polymers having a molecular weight of about 1,000 to 20,000 and synthetic rubbers having a molecular weight of about 5,000 to 50,000 and selected from the group consisting of polyisobutylene, polyisoprene, polychloroprene, isoprene-isobutylene copolymes, polybutadiene, butadiene-styrene copolymers, butadiene-acrylonitrile copolymers and butadiene-isobutylene copolymers, and containing a group capable of releasing an isocyanate group under heating in the range of from 100° to 250°C. for 10 to 60 minutes, a homopolymer of said α, β-ethylenically unsaturated monomer being insoluble in said organic liquid and at least one of said α, β-ethylenically unsaturated monomer and said component solvated in said organic liquid containing an active hydrogen atom wherein the solvated component constitutes 5 to 65% by weight of the total dispersed solids, the ratio of latent isocyanate group/active hydrogen group is from 0.3 to 2.0, provided that when the vinyl polymer or synthetic rubber is used as the active hydrogen-containing component the OH value of the vinyl polymer or synthetic rubber is at least 10, and that when said vinyl polymer is used as the active hydrogen-containing component, said vinyl polymer is a copolymer formed from up to 10 mole% of an hydroxy group-containing monomer and at least 90 mole% of other vinyl monomer, said polymerization temperature being lower than said isocyanate-releasing temperature.

10. A process for the preparation of powdery thermosetting coating compositions, which comprises polymerizing at a temperature in the range of from 70° to 100°C. at least one α, β-ethylenically unsaturated monomer in an organic liquid of no polarity or a low dissolving power capable of dissolving monomers but incapable of dissolving polymers formed from the monomers in the presence of a component solvated in said organic liquid selected from the group consisting of vinyl polymers having a molecular weight of about 1,000 to 20,000 and synthetic rubbers having a molecular weight of about 5,000 to 50,000 and selected from the group consisting of polyisobutylene, polyisoprene, polychloroprene, isoprene-isobutylene copolymers, polybutadiene, butadiene-styrene copolymers, butadiene-acrylonitrile copolymers and butadiene-isobutylene copolymers, and containing a group capable of releasing an isocyanate group under heating in the range of from 100° to 250°C. for 10 to 60 minutes, a homopolymer of said α, β-ethylenically unsaturated monomer being insoluble in said organic liquid and at least one of said α, β-ethylenically unsaturated monomer and said component solvated in said organic liquid containing an active hydrogen atom to form a polymer dispersion, and spray drying the polymer dispersion, wherein the solvated component constitutes 5 to 65% by weight of the total dispersed solids, the ratio of latent isocyanate group/active hydrogen group is from 0.3 to 2.0, provided that when the vinyl polymer or synthetic rubber is used as the active hydrogen-containing component the OH value of the vinyl polymer or synthetic rubber is at least 10, that when said vinyl polymer is used as the active hydrogen-containing component, said vinyl polymer is a copolymer formed from up to 10 mole% of an hydroxy group-containing monomer and at least 90% of other vinyl monomer, and that the monomers and solvated component are selected so that the glass transition point of the particles is 30° to 120°C., said polymerization temperature being lower than said isocyanate-releasing temperature.

11. A process for the preparation of thermosetting coating compositions, which comprises reacting a copolymerizable, latent isocyanate-containing, unsaturated monomer capable of releasing an isocyanate group under heating in the range of from 100° to 250°C. for 10 to 60 minutes, in an organic liquid of no polarity or a low dissolving power capable of dissolving monomers but incapable of dissolving polymers formed from the monomers, with a component selected from the group consisting of synthetic rubbers having a molecular weight of about 5,000 to 50,000 and selected from the group consisting of polyisobutylene, polyisoprene, polychloroprene, isoprene-isobutylene copolymers, polybutadiene, butadiene-styrene copolymers, butadiene-acrylonitrile copolymers and butadiene-isobutylene copolymers and copolymerizable, α, β-ethlenically unsaturated monomers, polymers of which are capable of being solvated in said organic liquid, to thereby form a component solvated in said organic liquid, and polymerizing at a temperature in the range of from 70° to 100°C. at least one α, β-ethlenically unsaturated monomer, a homopolymer of which is insoluble in said organic liquid, in the presence of the thus obtained component solvated in said organic liquid, at least one of said solvated component and said α, β-ethylenically unsaturated monomer containing an active hydrogen atom, wherein the solvated component constitutes 5 to 65% by weight of the total dispersed solids, the ratio of latent isocyanate group/active hydrogen group is from 0.3 to 2.0, provided that when the synthetic rubber is used as the active hydrogen-containing component the OH value of the synthetic rubber is at least 10, said polymerization temperature being lower than said isocyanate-releasing temperature.

12. A process for the preparation of powdery thermosetting coating compositions, which comprises reacting a copolymerizable, latent isocyanate-containing, unsaturated monomer capable of releasing an isocyanate group under heating in the range of from 100° to 250°C. for 10 to 60 minutes, in an organic liquid of no polarity or a low dissolving power capable of dissolving monomers but incapable of dissolving polymers formed from the monomers with a component selected from the group consisting of synthetic rubbers having a molecular weight of about 5,000 to 50,000 and selected from the group consisting of polyisobutylene, polyisoprene, polychloroprene, isoprene-isobutylene copolymers, polybutadiene, butadiene-styrene copolymers, butadiene-acrylonitrile copolymers and butadiene-isobutylene copolymers and copolymerizable, $\alpha$, $\beta$-ethylenically unsaturated monomers, polymers of which are capable of being solvated in said organic liquid, to thereby form a component solvated in said organic liquid, polymerizing at a temperature in the range of from 70° to 100°C. at least one $\alpha$, $\beta$-ethylenically unsaturated monomer, a homopolymer of which is insoluble in said organic liquid, in the presence of the thus obtained component solvated in said organic liquid, at least one of said solvated component and said $\alpha$, $\beta$-ethylenically unsaturated monomer containing an active hydrogen atom, to form a polymer dispersion and spray drying the polymer dispersion, wherein the solvated component constitutes 5 to 65% by weight of the total dispersed solids, the ratio of latent isocyanate group/active hydrogen group is from 0.3 to 2.0, provided that when the synthetic rubber is used as the active hydrogen-containing component the OH value of the synthetic rubber is at least 10, and that the monomers and solvated component are selected so that the glass transition point of the particles is 30° to 120°C., said polymerization temperature being lower than said isocyanate-releasing temperature.

13. The product of claim 7.
14. The product of claim 10.
15. The product of claim 12.

* * * * *